US011714810B2

(12) United States Patent
Ahmed et al.

(10) Patent No.: US 11,714,810 B2
(45) Date of Patent: Aug. 1, 2023

(54) JOIN-BASED CONTAINMENT FOR SET OPERATION-BASED SUB QUERY REMOVAL

(71) Applicant: Oracle International Corporation, Redwood Shores, CA (US)

(72) Inventors: Rafi Ahmed, Fremont, CA (US); Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/213,034

(22) Filed: Mar. 25, 2021

(65) Prior Publication Data

US 2022/0309062 A1 Sep. 29, 2022

(51) Int. Cl.
*G06F 16/2453* (2019.01)

(52) U.S. Cl.
CPC .. *G06F 16/24535* (2019.01); *G06F 16/24537* (2019.01)

(58) Field of Classification Search
CPC .............. G06F 16/24535; G06F 16/24537
See application file for complete search history.

(56) References Cited

U.S. PATENT DOCUMENTS

| | | | | |
|---|---|---|---|---|
| 5,584,024 | A * | 12/1996 | Shwartz | G06F 16/243 704/7 |
| 5,761,657 | A * | 6/1998 | Hoang | G06F 16/24542 |
| 6,411,951 | B1 * | 6/2002 | Galindo-Legaria | G06F 16/24549 |
| 6,529,896 | B1 * | 3/2003 | Leung | G06F 16/24542 |
| 7,379,933 | B1 * | 5/2008 | Witkowski | G06F 16/24537 707/999.005 |
| 7,587,383 | B2 * | 9/2009 | Koo | G06F 16/24537 |
| 8,150,865 | B2 | 4/2012 | Ahmed | |
| 2007/0219943 | A1 * | 9/2007 | Draughn | G06F 16/24535 |

(Continued)

OTHER PUBLICATIONS

Zuzarte et al., "WinMagic: subquery elimination using window aggregation" SIGMOD '03: Proceedings of the 2003 ACM SIGMOD international conference on Management of data Jun. 2003, pp. 652-656 t (Year: 2003).*

*Primary Examiner* — Mark D Featherstone
*Assistant Examiner* — Kweku William Halm
(74) *Attorney, Agent, or Firm* — Hickman Becker Bingham Ledesma LLP

(57) ABSTRACT

Techniques are described herein for subquery removal given two set operation-based subqueries in a query, where one subquery contains the result of the other. The described optimization technique of subquery removal is enabled by join and set operation-based containment of the set operation-based subqueries where semantic equivalence can be established for a given pair of set operation-based subqueries when some table(s)—with associated join condition(s), correlation condition(s), and/or filter predicate(s)—in one subquery are not considered. Subquery removal reduces multiple access to the same table and multiple evaluations of the same join conditions required to evaluate the query. When a subquery is removed from a disjunction, this may lead to other optimizations such as subquery unnesting, e.g., when the original query configuration would not permit query unnesting and the rewritten query (with one or more removed subqueries) permits unnesting.

24 Claims, 5 Drawing Sheets

(56) References Cited

U.S. PATENT DOCUMENTS

2008/0306906 A1* 12/2008 Zuzarte ............ G06F 16/90335
707/E17.14
2010/0030756 A1* 2/2010 Ahmed ............. G06F 16/24534
707/E17.136
2014/0101130 A1* 4/2014 Kang ................ G06F 16/24544
707/714
2014/0379690 A1* 12/2014 Ahmed ............. G06F 16/24544
707/713

* cited by examiner

JOIN-BASED CONTAINMENT FOR SET OPERATION-BASED SUB QUERY REMOVAL

CROSS-REFERENCE TO RELATED APPLICATIONS

This application is related to application Ser. No. 12/182,002, filed Jul. 29, 2008, now U.S. Pat. No. 8,150,865 B2, issued Apr. 3, 2012, and referred to herein as the "Techniques for Coalescing Subqueries", the entire contents of which is hereby incorporated by reference as if fully set forth herein.

FIELD OF THE INVENTION

The present invention relates to database systems and, in particular, to optimization of queries executed by a database system.

BACKGROUND

Relational and object-relational database management systems store information in tables of rows in a database. To retrieve data, queries that request data are submitted to a database server, which computes the queries and returns the data requested from the database. Query statements submitted to the database server should conform to the syntactical rules of a particular query language. One popular query language, known as the Structured Query Language (SQL), provides users a variety of ways to specify information to be retrieved.

A query that is submitted to a database server is analyzed by a query optimizer. Based on the analysis, the query optimizer generates an execution plan optimized for efficient execution of the query. The optimized execution plan may be based on a rewrite of the query.

Many times, when a query includes multiple subqueries that access the same tables and have the same join conditions but are not equivalent, these subqueries are evaluated individually. However, evaluation of these kinds of subqueries on an individual basis is inefficient because doing so results in redundant access of the same tables and redundant performance of the same join evaluations. It is possible to coalesce subqueries when a pair of subqueries access the same tables and have the same join conditions and one of the subqueries includes one or more additional filter conditions and/or correlation conditions. (See, e.g., the Coalescing Subqueries Patent.) In this case, the pair of subqueries may be coalesced to one subquery.

Nevertheless, it is desirable to develop techniques for rewriting queries with multiple subqueries that access the same tables and have the same join conditions to reduce redundant accesses of the same tables and performance of the same join evaluations more often than only when one of the subqueries includes one or more additional filter conditions or correlation conditions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
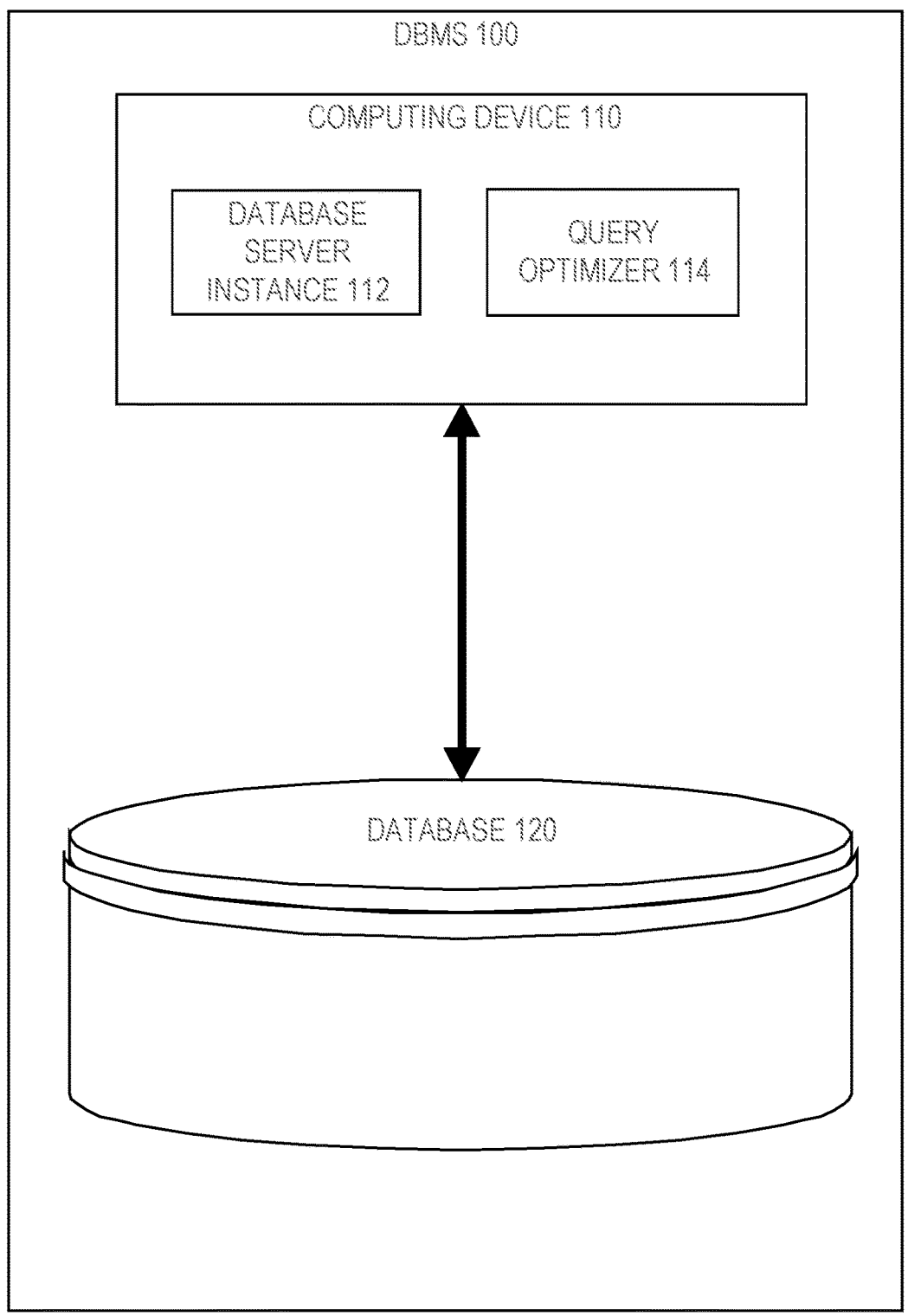
FIG. 1 depicts a block diagram of an example database management system running on a computing device.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for subquery removal given two set operation-based subqueries in a query, where one subquery contains the result of the other. The described optimization technique of subquery removal is enabled by join and set operation-based containment of the set operation-based subqueries where syntactic equivalence can be established for a given pair of subqueries when some table(s)—with associated join condition(s), correlation condition(s), and/or filter predicate(s)—in one subquery are not considered. The rules for subquery removal given here apply equally to both correlated and uncorrelated set operation-based subqueries.

Subquery removal reduces multiple access to the same table and multiple evaluations of the same join conditions required to evaluate the query. When a subquery is removed from a disjunction, this may lead to other optimizations such as subquery unnesting, e.g., when the original query configuration would not permit query unnesting and the rewritten query (with one or more removed subqueries) permits unnesting. Query unnesting merges a subquery into the body of an outer query or converts it into an inline view with various types of joins, which allows the query optimizer to optimize the query more effectively, e.g., by allowing the query optimizer to consider subquery tables and/or newly introduced inline views during access path optimization, to perform join order selection optimization, etc.

Queries containing multiple subqueries are quite common in many benchmarks and customer workloads. For example, experiments involving this technique resulted in a more than three times performance gain.

Definitions

According to embodiments described herein, a subquery appears in the WHERE clause of a main query; the subquery acts as a filter on the tables of the outer query block. A [sub]query X is considered to be semantically equivalent to another [sub]query Y if they return the same set of rows, but not necessarily in the same order. According to the principle of containment, subquery X is considered to contain another subquery Y if the result of Y is a (not necessarily proper)

subset of the result of X. In this case, X is the container subquery and Y is the contained subquery. However, establishing containment for two arbitrary query blocks is an intractable problem.

EXISTS, NOT EXISTS, ANY, IN, ALL, and NOT IN are set operations; hence, duplicates are considered insignificant in these types of subqueries. An EXISTS subquery evaluates to TRUE if the subquery produces at least one row; otherwise, it evaluates to FALSE. A NOT EXISTS subquery evaluates to TRUE if the subquery produces no rows; otherwise, it evaluates to TRUE. A join (i.e., of type inner or outer) with one or more tables in a subquery may duplicate the rows of common table(s), but the set semantics of set operation-based subqueries dictates that duplicates in results from such subqueries be considered insignificant and, thus, disregarded. Therefore, the addition of one or more tables in a set operation-based subquery can, effectively, only reduce the number of rows that the subquery returns.

Accordingly, two set operation-based subquery blocks SQ1 and SQ2 satisfy the principle of containment (i.e., SQ2⊆SQ1, where SQ2 is the container subquery and SQ1 is the contained subquery), if the following join and set operation-based containment criteria is satisfied: Semantic equivalence can be established for the two set operation-based subqueries when some table(s)—with associated join condition(s), correlation condition(s), and/or filter predicate(s)—in one subquery (i.e., the contained subquery) are not considered. This containment principle is referred to herein as the join and set operation-based (JSO) containment criteria.

Figure 2:
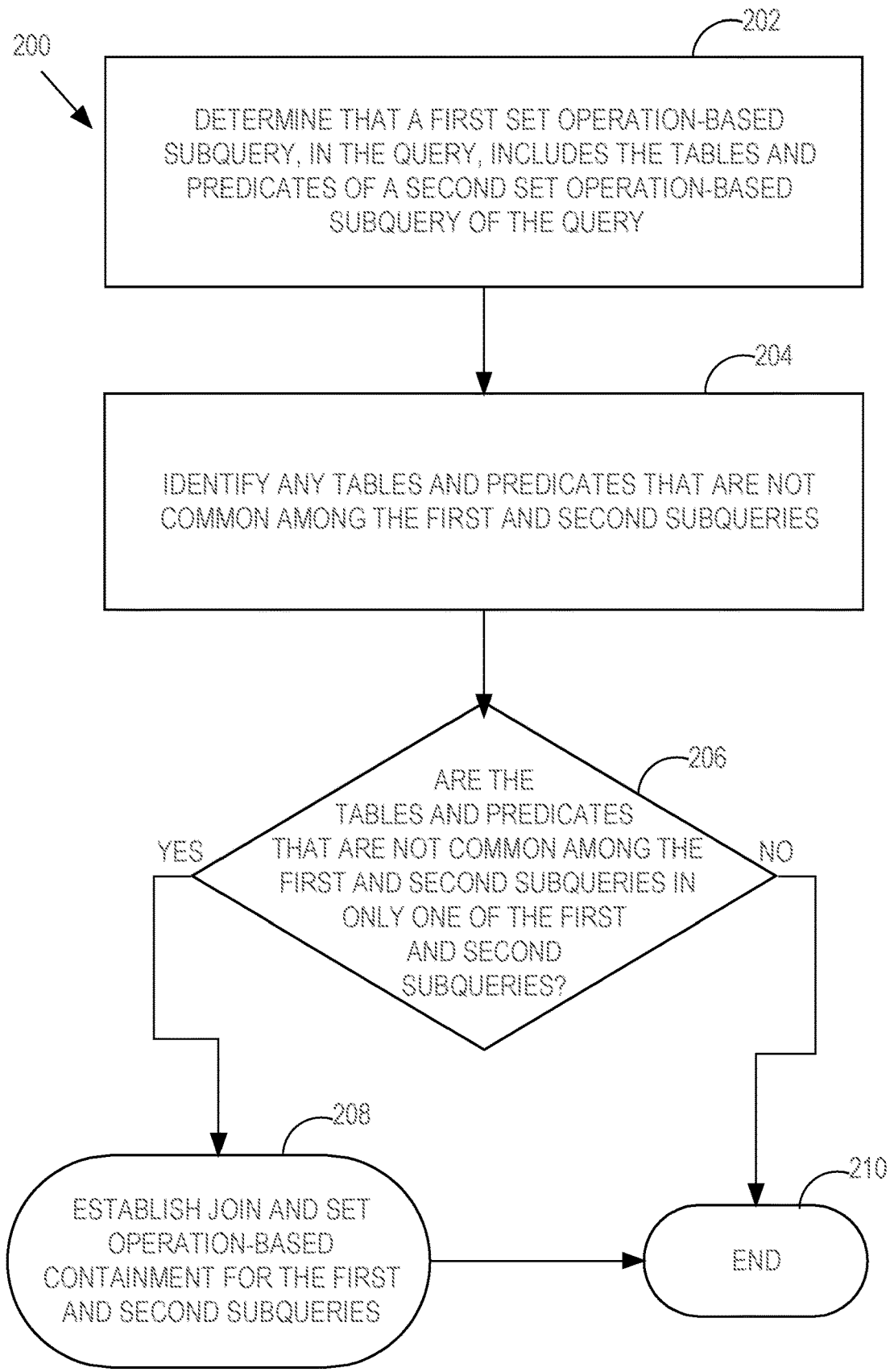
FIG. 2 depicts a flowchart for a database management system transforming a query to produce a transformed query comprising set operation-based subquery removal.

FIG. 2 depicts a flowchart 200 for a database management system establishing join and set operation-based containment for two set operation-based subqueries in a query. At step 202 of flowchart 200, it is determined that a first set operation-based subquery, in the query, includes the tables and predicates of a second set operation-based subquery of the query. To illustrate, consider the following query Q1 over tables T1, T2, T3, and T4, (e.g., stored at an example database 120 managed by a database management system (DBMS) 100 depicted in FIG. 1):

```
Q1  SELECT T1.x
    FROM T1
    WHERE   EXISTS  (SELECT 1   /* SQ1: the container subquery */
                     FROM T2
                     WHERE T2.z > 7 and T1.c = T2.c) AND
            EXISTS  (SELECT 1   /* SQ2: thecontained subquery */
                     FROM T2, T4
                     WHERE T2.z > 7 and T4.p = T2.q and T2.c = T1.c);
```

In Q1, both of the subqueries SQ1 and SQ2 contain a common table T2, identical filter predicates (i.e., T2.z>7), and identical correlation join predicates (i.e., T1.c=T2.c).

At step 204 of flowchart 200, any tables and predicates that are not common among the first and second subqueries are identified. For example, subquery SQ2 includes another table T4 and an additional join predicate (i.e., T4.p=T2.q) other than the tables and predicates that are common among SQ1 and SQ2.

At step 206, it is determined whether the tables and predicates, not common among the first and second subqueries, are in only one of the first and second subqueries. If so, at step 208, join and set operation-based containment is established for the first and second subqueries and then the flowchart ends at step 210. If not, the flowchart ends at step 210. For example, in the case of SQ1 and SQ2, only subquery SQ2 includes tables and predicates that are not common among the two subqueries. Because the results of the subqueries are equivalent when table T4 and the join predicate (T4.p=T2.q) in SQ2 are disregarded, then the JSO containment criteria is satisfied in that SQ1 is shown to contain SQ2.

Joining T2 with T4 can only reduce the set of rows of T2 selected by SQ2 when compared to the set of rows of T2 selected by SQ1. Specifically, in SQ2, the join between T4 and T2 might duplicate the rows of T2. However, because SQ2 is an EXISTS subquery that has set semantics, the duplicates generated by this join do not have any effect on the result of SQ2. Accordingly, the join between T2 and T4 eliminates, from the result set of SQ2, any rows that do not satisfy the join predicate with T4. Therefore, the set of rows returned by SQ2 is contained by that of SQL As such, SQ2 is the contained subquery and SQ1 is the container subquery (i.e., SQ2⊆SQ1).

JSO Containment-Based Subquery Removal

Techniques described herein perform subquery removal based, at least in part, on establishing that set operation-based subqueries in a query satisfy the JSO containment criteria described above. Specifically, subquery removal in such cases is possible because a subquery in the WHERE clause of a query acts like a filter on the tables in the outer query block.

According to an embodiment, DBMS 100 transforms a query to produce a transformed query comprising set operation-based subquery removal. Specifically, DBMS 100 transforms a query to produce a transformed query; wherein the query includes a plurality of subqueries; wherein said transforming the query includes: in response to the database management system determining that a pair of set operation-based subqueries, of the plurality of subqueries, satisfies JSO containment criteria, performing subquery removal, wherein the pair of set operation-based subqueries comprises a contained subquery and a container subquery, and wherein said performing subquery removal comprises eliminating one or more of the pair of set operation-based subqueries. DBMS 100 may also apply one or more additional query rewrites/transformations to the query. DBMS 100 executes the transformed query.

To illustrate, when a query, such as Q1, is analyzed for query optimization by example query optimizer 114 of DBMS 100, the database server instance determines whether the query includes subqueries (in the WHERE clause) that satisfy the JSO containment criteria. Embodiments are described in connection with the DBMS configuration of FIG. 1, but are not limited thereto. To determine whether subqueries satisfy the JSO containment criteria, DBMS 100 determines whether semantic equivalence can be established for a given pair of subqueries in the query when some table(s)—with associated join condition(s), correlation condition(s), and/or filter predicate(s)—in one subquery (i.e., the contained subquery) are not considered. According to an embodiment, if there are aspects of both subqueries that would need to be ignored in order to establish equivalence, the JSO containment criteria is not satisfied.

In the case of query Q1, if table T4 and the associated join predicate (i.e., T4.p=T2.q) in subquery SQ2 are not considered, SQ1 and SQ2 are semantically equivalent. Thus, the subqueries are semantically equivalent when one or more tables—with associated join condition(s), correlation condition(s), and/or filter predicate(s)—from one of the subqueries are not considered. When a query is referred to herein as including a "container" subquery and a "contained" subquery, DMBS 100 has determined that the query these subqueries satisfy the JSO containment criteria as indicated above.

Conjunctive Exists Subqueries

Figure 3:
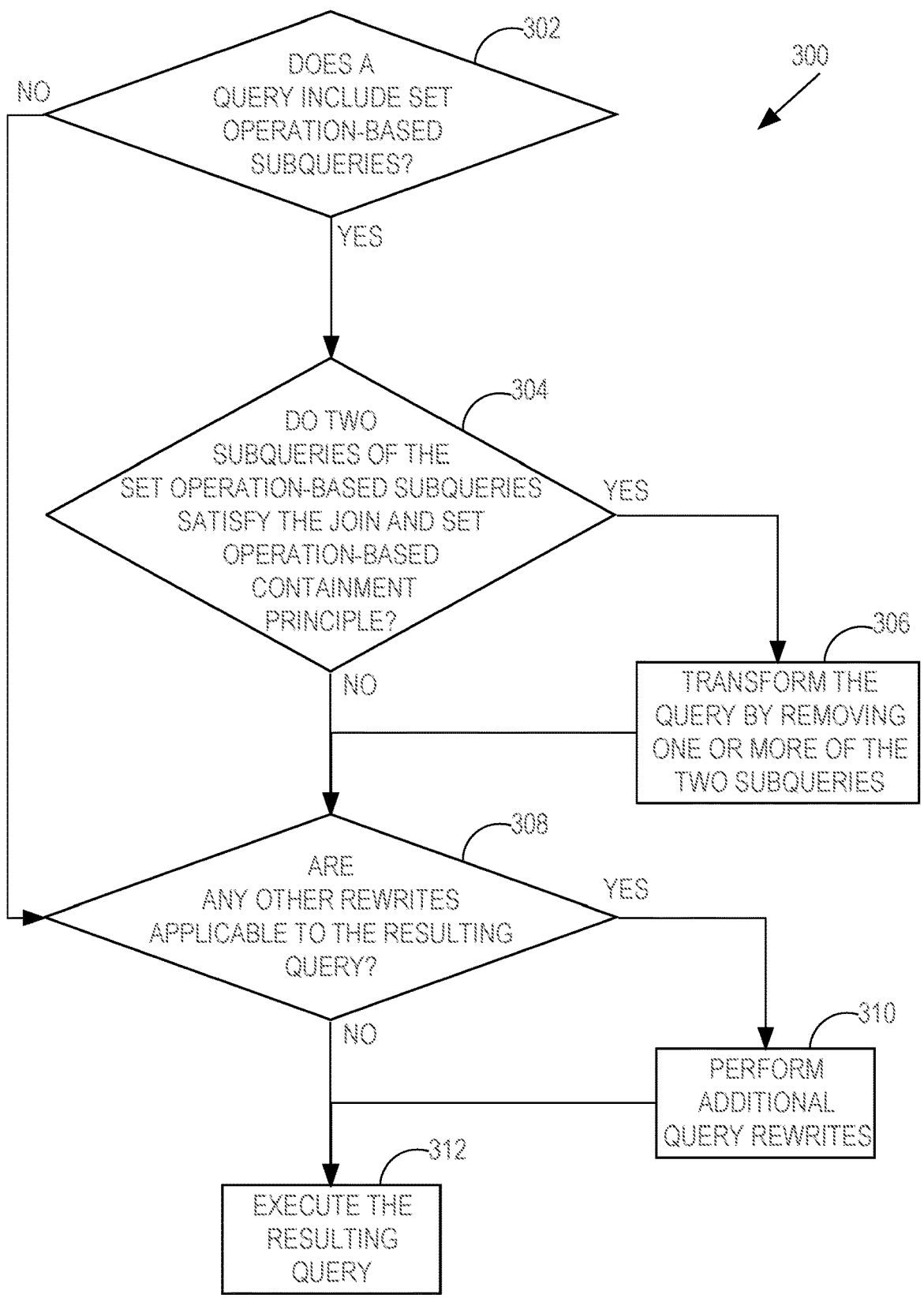
FIG. 3 depicts a flowchart for establishing join and set operation-based containment for a pair of set operation-based subqueries in a query.

FIG. 3 depicts a flowchart 300 for establishing join and set operation-based containment for a pair of set operation-based subqueries in a query. At step 302, it is determined whether a query includes set operation-based subqueries. If so, control passes to step 304, and if not, control passes to step 308. For example, DBMS 100 determines that the following query Q2 includes the set operation-based subqueries SQ1 and SQ2:

```
Q2  SELECT T1.x
    FROM T1
    WHERE  EXISTS  (SELECT 1        /* SQ1 */
                    FROM T2
                    WHERE T2.z > 7 and T1.c = T2.c) AND
           EXISTS  (SELECT 1        /* SQ2 */
                    FROM T2, T3
                    WHERE T2.z > 7 and T3.r = T2.r and T1.c = T2.c);
```

Specifically, SQ1 of the query is a container EXISTS subquery and SQ2 is a contained EXISTS subquery, which are set operations.

At step 304 of flowchart 300, it is determined whether two subqueries, of the join-and-set operation-based subqueries, satisfy the join and set operation-based containment criteria. If so, control passes to step 306, and if not, control passes to step 308. For example, DBMS 100 determines that subqueries SQ1 and SQ2 of query Q2 satisfy the criteria of JSO containment because, other than table T3 (and associated join condition "T3.r=T2.r") in subquery SQ2, the two subqueries are equivalent in that they both include table T2, with the correlation join condition "T1.c=T2.c" and the filter condition "T2.z>7" and, as such, return equivalent row sets. Because SQ2 includes the "extra" query components, SQ2 is the contained subquery and SQ1 is the container subquery. As used herein, "query components" include tables, join conditions, and filter conditions within a query.

At step 306, the query is transformed by removing one or more of the two subqueries. For example, in the case of conjunctive (ANDed) EXISTS subqueries that satisfy the JSO containment criteria, when the contained EXISTS subquery evaluates to TRUE (i.e., it returns one or more rows), the container EXISTS subquery must also evaluate to TRUE. Additionally, when the contained subquery evaluates to FALSE, the container subquery becomes redundant, since they are in conjunction. Thus, the contained subquery can be retained and the container subquery, which is redundant, can be removed.

According to an embodiment, a query optimizer 114 of DBMS 100 determines that Q2 includes conjunctive EXISTS subqueries where one of the subqueries contains the other subquery (according to the criteria of JSO containment described above). In response to this determination, the query optimizer transforms Q2 into the following query Q3 in which the container subquery SQ1 is removed:

```
Q3  SELECT T1.x
    FROM T1
    WHERE  EXISTS  (SELECT 1        /* SQ2 */
                    FROM T2, T3
                    WHERE T2.z > 7 and T3.r = T2.r and T1.c = T2.c);
```

At step 308, it is determined whether any other query rewrites are applicable to the resulting query. If so, control passes to step 310, and if not, control passes to step 312. At step 310, the additional query rewrite(s) are performed, and at step 312, the resulting query is executed, with any applicable transformations. After any other applicable query rewrites, database server instance 112 executes the transformed query.

Execution of query Q3 is more efficient than execution of query Q2 because Q3 requires less table accesses than Q2. Query Q3 also requires less join operations than Q2, which are generally expensive to execute.

Disjunctive EXISTS Subqueries

In the case of disjunctive (ORed) EXISTS subqueries that satisfy the JSO containment criteria, when the container subquery evaluates to FALSE, the contained subquery must also evaluate to FALSE. When the container subquery evaluates to TRUE, the result of the contained EXISTS subquery is not required because the disjunctive result is necessarily TRUE. Therefore, the contained subquery is redundant since the subqueries are in a disjunction. As such, the container subquery can be retained and the contained subquery can be removed.

Thus, according to an embodiment, based on determining that a query includes disjunctive EXISTS subqueries that satisfy the JSO containment criteria, query optimizer 114 of DBMS 100 rewrites the query such that the container subquery is retained and the contained subquery is eliminated. After any other applicable query rewrites, the transformed query is executed by database server instance 112.

Disjunctive NOT EXISTS Subqueries

In the case of disjunctive NOT EXISTS subqueries that satisfy the JSO containment criteria, when the contained subquery evaluates to FALSE (i.e., the subquery returns one or more rows), the container subquery must also evaluate to FALSE. Further, when the contained subquery evaluates to TRUE, the result of container subquery becomes redundant, since the subqueries are in a disjunction. Thus, the contained subquery can be retained and the redundant container subquery can be removed.

Consider the following example query Q4:

```
Q4  SELECT T1.n
    FROM T1
    WHERE   NOT EXISTS   (SELECT 1         /* SQ1 */
                          FROM T2, T3
                          WHERE T2.n = T3.h and T2.c = T1.c) OR
            NOT EXISTS   (SELECT 1         /* SQ2 */
                          FROM T2, T3, T5
                          WHERE T2.g = T5.d and T2.c = T1.c and T3.h =
                          T2.n);
```

Subqueries SQ1 and SQ2 of query Q4 satisfy the JSO containment criteria because, other than table T5 and join condition "T2.g=T5.d" in subquery SQ2, the two subqueries are equivalent in that they both reference tables T1, T2 and T3, with the join conditions "T2.n=T3.h" and "T2.c=T1.c" and, as such, return equivalent row sets. Because SQ2 includes the "extra" table T5 and join condition "T2.g=T5.d", SQ2 is the contained subquery and SQ1 is the container subquery.

According to an embodiment, based on determining that Q4 contains disjunctive NOT EXISTS subqueries that satisfy the JSO containment criteria, query optimizer 114 of DBMS 100 transforms Q4 into the following query Q5 in which the container subquery is removed:

```
Q5  SELECT T1.n
    FROM T1
            NOT EXISTS   (SELECT 1         /* SQ2 */
                          FROM T2, T3, T5
                          WHERE T2.g = T5.d and T2.c = T1.c and T2.n =
                          T3.h);
```

After any other applicable query rewrites, database server instance 112 executes transformed query. Execution of query Q5 is more efficient than execution of query Q4 because Q5 requires less table accesses than Q4, and also requires less join operations.

Conjunctive NOT EXISTS Subqueries

In the case of conjunctive NOT EXISTS subqueries that satisfy the JSO containment criteria, when the container subquery evaluates to TRUE (i.e., the subquery produces no rows), then the contained subquery also evaluates to TRUE. Also, when the container subquery evaluates to FALSE (i.e., the subquery returns some rows), then the result of the contained subquery is redundant because they are in a conjunction. Therefore, in this case, the contained subquery can be removed.

Conjunctive EXISTS Subquery Contains NOT EXISTS Subquery

In the case of conjunctive subqueries where an EXISTS subquery contains a NOT EXISTS subquery, when the contained NOT EXISTS subquery evaluates to FALSE (i.e., the subquery produces some rows), then the conjunctive result of the two subqueries is FALSE. However, when the contained NOT EXISTS subquery evaluates to TRUE (i.e., the subquery produces no rows), then the result of the container EXISTS subquery is indeterminate. Therefore, in this case, subquery removal is not possible.

Conjunctive NOT EXISTS Subquery Contains EXISTS Subquery

According to an embodiment, DBMS 100 analyzes a query with conjunctive subqueries comprising a NOT EXISTS subquery that contains an EXISTS subquery. When the contained EXISTS subquery evaluates to TRUE (i.e., the subquery produces some rows), then the container NOT EXISTS subquery necessarily evaluates to FALSE. Also, when the contained EXISTS subquery evaluates to FALSE, the result of the NOT EXISTS subquery, whether TRUE or FALSE, is not required because the conjunctive result is necessarily FALSE. Further, when the container NOT EXISTS subquery evaluates to TRUE (i.e., the subquery produces no rows), then the contained EXISTS subquery evaluates to FALSE. When the container NOT EXISTS subquery evaluates to FALSE, the result of the contained EXISTS subquery, whether TRUE or FALSE, is not required because the conjunctive result is necessarily FALSE.

Thus, because all combinations of results in this case evaluate to FALSE, in response to determining that the query has a NOT EXISTS subquery that contains an EXISTS subquery, query optimizer 114 rewrites the query to replace both subqueries with a FALSE predicate.

Disjunctive EXISTS Subquery Contains NOT EXISTS Subquery

According to an embodiment, DBMS 100 analyzes a query with a disjunctive EXISTS subquery that contains a NOT EXISTS subquery. When the contained NOT EXISTS subquery evaluates to TRUE (i.e., the subquery produces no rows), then the result of the container EXISTS subquery is not required because the disjunctive result is necessarily true. Also, when the contained NOT EXISTS subquery evaluates to FALSE (i.e., the subquery produces some rows), then the container EXISTS subquery necessarily evaluates to TRUE, and the disjunctive result is TRUE. Further, when the container EXISTS subquery evaluates to TRUE (i.e., the subquery produces some rows), then the result of contained NOT EXISTS subquery is not required because the disjunctive result is necessarily TRUE. When the container EXISTS subquery evaluates to FALSE (i.e., the subquery produces no rows), then the contained NOT EXISTS subquery evaluates to TRUE and the disjunctive result is TRUE.

Thus, because all combinations of results in this case evaluate to TRUE, in response to determining that the query has a disjunctive EXISTS subquery that contains a NOT EXISTS subquery, query optimizer 114 rewrites the query to remove both subqueries. After any other applicable query rewrites, DBMS 100 executes the transformed query.

Disjunctive NOT EXISTS Subquery Contains EXISTS Subquery

In the case of disjunctive subqueries where a NOT EXISTS subquery contains an EXISTS subquery, when the contained EXISTS subquery evaluates to TRUE (i.e., the subquery produces some rows), the disjunctive result is TRUE. However, when the contained EXISTS subquery evaluates to FALSE (i.e., the subquery produces no rows), the result of the container NOT EXISTS subquery is indeterminate. In this case, subquery removal is not possible.

Evaluating More than Two Set Operation-Based Subqueries

Although the techniques and samples for subquery removal are described herein as binary operations involving only two subqueries, subquery removal analysis of two subqueries at a time may be repeated for any number of subqueries. Therefore, the techniques for subquery removal described herein may also be applied, iteratively, to perform subquery removal analysis for more than two subqueries in a query.

For example, DBMS 100 analyzes the following query Q6, which contains three disjunctive subqueries, SQ1, SQ2, and SQ3:

subqueries SQ2 and SQ3 of query Q7 satisfy the JSO containment criteria because, other than tables T3 and T5 and join conditions "T2.g=T5.d" and "T2.n=T3.h" in subquery SQ2, the two subqueries are equivalent in that they both include tables T1 and T2, with the join condition "T2.c=T1.c" and, as such, return equivalent row sets. Because SQ2 includes the "extra" table and join predicate, SQ2 is the contained subquery and SQ3 is the container subquery. Accordingly, query optimizer 114 determines that query Q7 includes an EXISTS subquery that contains a NOT EXISTS subquery, which are disjunctive. Based on this determination, query optimizer 114 rewrites the query to remove both subqueries SQ2 and SQ3 as follows in Query Q8:

```
Q8  SELECT T1.n FROM T1
```

After any other applicable query rewrites, database server instance 112 executes the transformed query. Execution of query Q8 is much more efficient than execution of query Q6 because all join operations and filter operations have been removed from the query.

The example above considered the subqueries of Q6 in the order presented in the query. However, query optimizer 114 may choose to consider the subqueries of a query in any

```
Q6  SELECT T1.n
    FROM T1
    WHERE   NOT EXISTS  (SELECT 1                              /* SQ1 */
                         FROM T2, T3
                         WHERE T2.n = T3.h and T2.c = T1.c) OR
            NOT EXISTS  (SELECT 1                              /* SQ2 */
                         FROM T2, T3, T5
                         WHERE T2.g = T5.d and T2.c = T1.c and T3.h =
                               T2.n) OR
            EXISTS      (SELECT 1                              /* SQ3 */
                         FROM T2
                         WHERE T2.c = T1.c);
```

DBMS 100 first analyzes subqueries SQ1 and SQ2, which are disjunctive NOT EXISTS queries. Subqueries SQ1 and SQ2 of query Q6 satisfy the JSO containment criteria because, other than table T5 and join condition "T2.g=T5.d" in subquery SQ2, the two subqueries are equivalent in that they both include tables T1, T2 and T3, with the join conditions "T2.n=T3.h" and "T2.c=T1.c" and, as such, return equivalent row sets. Because SQ2 includes the "extra" query components, SQ2 is the contained subquery and SQ1 is the container subquery.

According to an embodiment, based on determining that SQ1 and SQ2 of Q6 are disjunctive NOT EXISTS subqueries that satisfy the JSO containment criteria, query optimizer 114 of DBMS 100 transforms Q6 into the following query Q7 in which the container subquery SQ1 is removed:

order, or it may generate multiple potential query rewrites based on different orders of subquery consideration to identify the most efficient query rewrite.

Subquery Conversion

Non-exist subquery types that are based on set operations (i.e., ANY, IN, ALL, and NOT IN) may be converted into EXIST and NOT EXIST subquery types. Specifically, by modifying the connecting condition into a correlating condition, an ANY/IN subquery can be converted into a semantically equivalent EXISTS subquery, and an ALL/NOT IN subquery can be converted into a semantically equivalent NOT EXISTS subquery. Therefore, the techniques described above also apply to ANY, IN, ALL, and NOT IN subqueries. Note that IN is equivalent to =ANY and NOT IN is equivalent to !=ALL.

```
Q7  SELECT T1.n
    FROM T1
    WHERE   NOT EXISTS  (SELECT 1                              /* SQ2 */
                         FROM T2, T3, T5
                         WHERE T2.g = T5.d and T2.c = T1.c and T2.n =
                               T3.h) OR
            EXISTS      (SELECT 1                              /* SQ3 */
                         FROM T2
                         WHERE T2.c = T1.c);
```

DBMS 100 then analyzes the remaining two subqueries SQ2 and SQ3 in Q7 for JSO containment-based subquery removal. Specifically, query optimizer 114 determines that For example, DBMS 100 converts the subqueries of a query to EXISTS or NOT EXISTS to determine if JSO containment-based subquery removal according to the techniques described herein can take place. According to an embodiment, if no subquery removal takes place, query processing proceeds using the unconverted subqueries.

Consider an ANY subquery in the following query Q9:

```
Q9   SELECT T1.n
     FROM T1
     WHERE t1.m > ANY  (SELECT 2.d
                        FROM T2, T3
                        WHERE T2.n = T3.h and T2.c = T1.c);
```

The ANY subquery of query Q9 can be converted into an EXISTS subquery as in the following query Q10:

```
Q10  SELECT T1.n
     FROM T1
     WHERE   EXISTS  (SELECT 1
                      FROM T2, T3
                      WHERE T2.n = T3.h and T2.c = T1.c and
                         T1.m > T2.d);
```

Specifically, the SQL "T1.m>ANY (SELECT T2.d" in query Q9 is represented by the conversion of the subquery to an EXISTS subquery with the addition of a correlation predicate, "T1.m>T2.d", in the subquery WHERE clause of query Q10.

Further consider a NOT IN subquery in the following query Q11:

```
Q11  SELECT T1.n
     FROM T1
     WHERE t1.d NOT IN  (SELECT T2.g
                         FROM T2, T3
                         WHERE T2.n = T3.h and T2.c = T1.c);
```

The NOT IN subquery of Q11 can be converted into a NOT EXISTS subquery as shown in the following query Q12, if T1.d and T2.g always return non-NULL values. It is noted that, when T1.d and T2.g might return null values, conversion is performed differently.

```
Q12  SELECT T1.n
     FROM T1
     WHERE   NOT EXISTS  (SELECT 1
                          FROM T2, T3
                          WHERE T2.n = T3.h and T2.c = T1.c and
                             T1.d = T2.g);
```

Specifically, the SQL "T1.d NOT IN (SELECT T2.g" in query Q11 is represented by the conversion of the subquery to a NOT EXISTS subquery with the addition of a correlation predicate, "T1.d=T2.g", in the subquery WHERE clause in query Q12.

Further Query Transformation

The transformed query that is executed by DBMS 100, after performing set operation-based subquery removal as described herein, may be further transformed by the DBMS either before or after the subquery removal. For example, after performing subquery removal on a query that removes a set operation-based subquery that was in disjunction with another subquery, such that the remaining subquery is no longer in disjunction, query optimizer 114 further transforms the query to unnest the remaining subquery, which is generally not possible for the subqueries in disjunction. This query unnesting enables exploration of further optimizations on the query that are not possible to perform on subquery portions of a query.

Database Overview

Embodiments of the present invention are used in the context of database management systems (DBMSs), such as DBMS 100 of FIG. 1. Therefore, a description of an example DBMS is provided.

Generally, a server, such as database server instance 112, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database, such as database 120, comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer (such as query optimizer 114) to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

Database 120 may reside in volatile and/or non-volatile storage, including persistent storage or flash memory, or volatile memory of computing device 110. Additionally, or alternatively, database 120 may be stored, at least in part, in main memory of a database server computing device.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
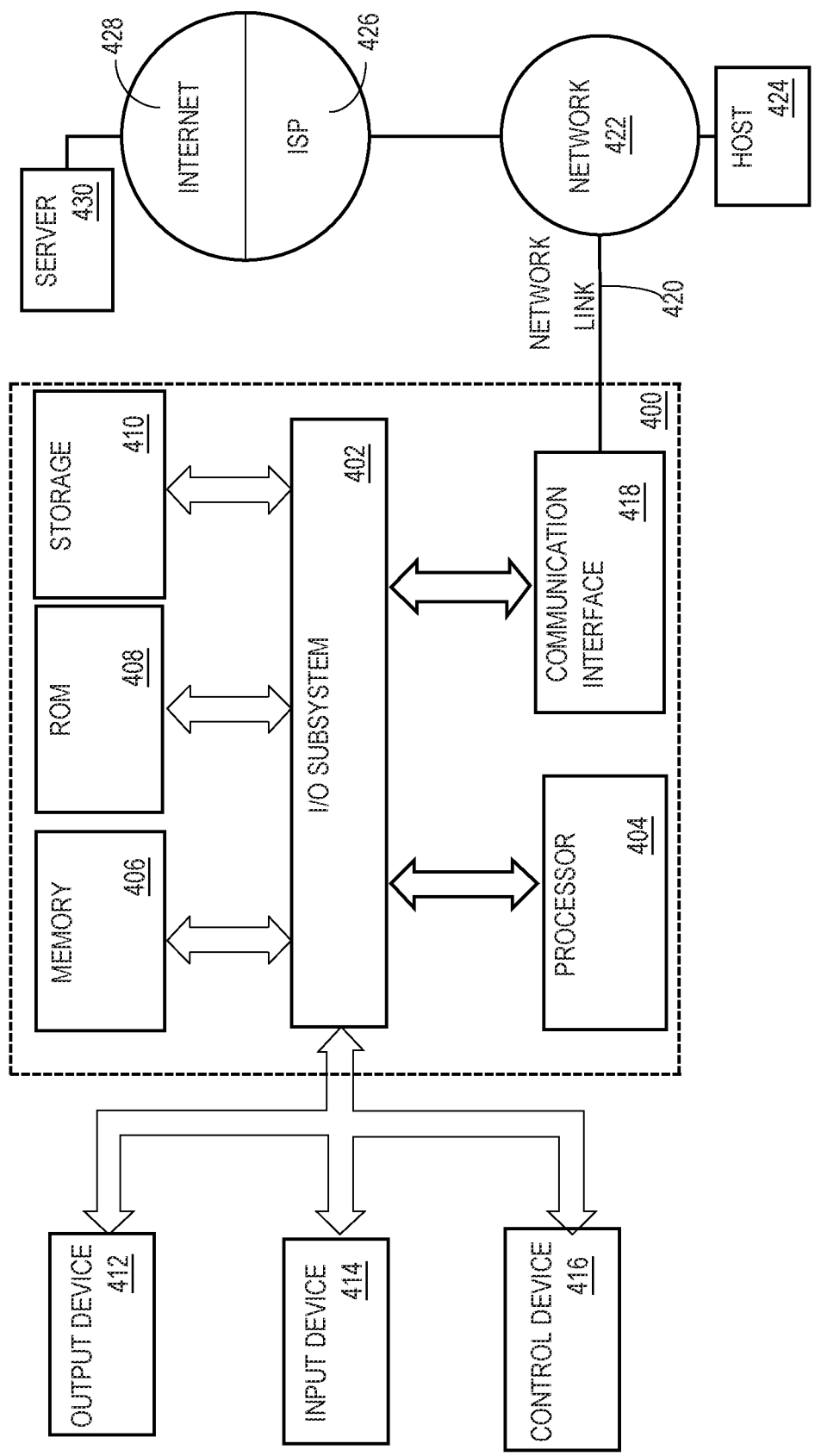
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
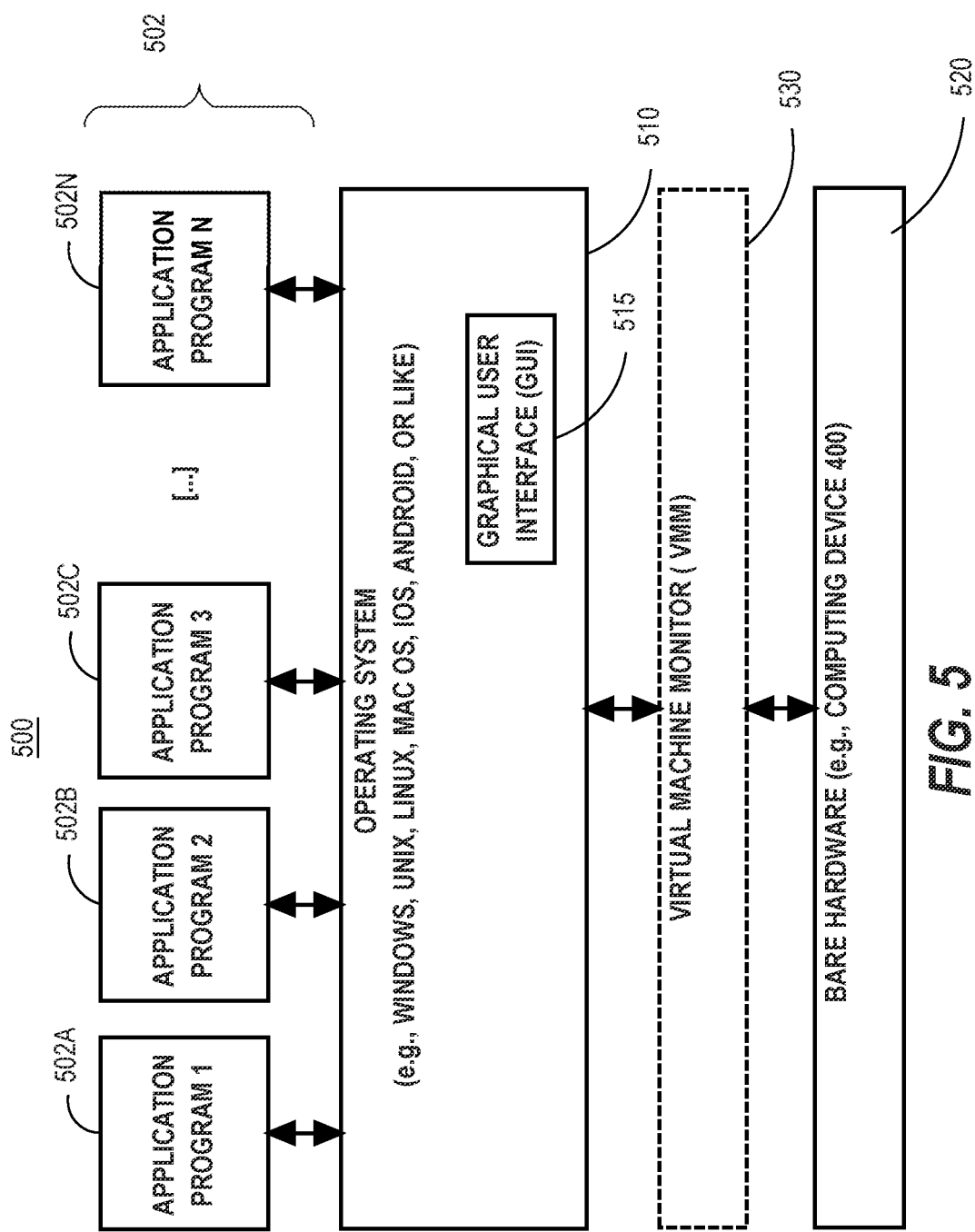
FIG. 5 is a block diagram of a basic software system that may be employed for controlling the operation of a computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method, comprising:
a database management system transforming a query to produce a transformed query;
wherein the query includes a plurality of subqueries;
wherein said transforming the query comprises:
determining whether a pair of set operation-based subqueries, of the plurality of subqueries, satisfies join-and-set-operation-based containment criteria at least by:
identifying one or more tables that are not common among the pair of set operation-based subqueries as uncommon one or more tables;
determining the uncommon one or more tables are referenced in a particular subquery of the pair of set operation-based subqueries and are not referenced in any other subquery of the pair of set operation-based subqueries thereby determining a contained subquery and a container subquery of the pair of set operation-based subqueries; and
in response to determining that the uncommon one or more tables are referenced in the particular subquery of the pair of set operation-based subqueries and are not referenced in any other subquery of the pair of set operation-based subqueries, determining that the pair of set operation-based subqueries, satisfies the join-and-set-operation-based containment criteria;
in response to the database management system determining that the pair of set operation-based subqueries, of the plurality of subqueries, satisfies the join-and-set-operation-based containment criteria, performing subquery removal,
wherein the pair of set operation-based subqueries comprises the contained subquery and the container subquery, and
wherein said performing the subquery removal comprises eliminating one or more of the pair of set operation-based subqueries; and
executing the transformed query;
wherein the method is performed by one or more computing devices.

2. The method of claim 1, wherein said performing the subquery removal further comprises not replacing the eliminated one or more of the pair of set operation-based subqueries with any other subquery.

3. The method of claim 1, wherein:
the container subquery includes a particular set of query components that comprises at least one table and zero or more of:
a join condition for the at least one table,
a correlation condition for the at least one table, or
a filter condition for the at least one table; and
said determining that the pair of set operation-based subqueries satisfies the join-and-set-operation-based containment criteria comprises determining that the contained subquery comprises the particular set of query components and at least one additional table and zero or more of:
a join condition for the at least one additional table,
a correlation condition for the at least one additional table, or
a filter condition for the at least one additional table.

4. The method of claim 1, wherein:
both the container subquery and the contained subquery are EXISTS subqueries;
the container subquery is conjunctive with the contained subquery; and
said eliminating comprises eliminating the container subquery.

5. The method of claim 1, wherein:
both the container subquery and the contained subquery are EXISTS subqueries;
the container subquery is disjunctive with the contained subquery; and
said eliminating comprises eliminating the contained subquery.

6. The method of claim 1, wherein:
both the container subquery and the contained subquery are NOT EXISTS subqueries;
the container subquery is disjunctive with the contained subquery; and
said eliminating comprises eliminating the container subquery.

7. The method of claim 1, wherein:
both the container subquery and the contained subquery are NOT EXISTS subqueries;
the container subquery is conjunctive with the contained subquery; and said eliminating comprises eliminating the contained subquery.

8. The method of claim 1, wherein:
the container subquery is a NOT EXISTS subquery;
the contained subquery is an EXISTS subquery;
wherein the container subquery is conjunctive with the contained subquery;
said eliminating comprises eliminating, from the query, the pair of set operation-based subqueries; and
said transforming the query further comprises replacing the pair of set operation-based subqueries with a FALSE predicate.

9. The method of claim 1, wherein:
the container subquery is an EXISTS subquery;
the contained subquery is a NOT EXISTS subquery;
wherein the container subquery is disjunctive with the contained subquery; and
said eliminating comprises eliminating, from the query, the pair of set operation-based subqueries.

10. The method of claim 1, wherein:
one or both of the pair of set operation-based subqueries are one of a set of non-exist subquery types comprising: ANY, IN, ALL, or NOT IN;
the method further comprises, prior to said determining that the pair of set operation-based subqueries satisfies the join-and-set-operation-based containment criteria, converting each subquery of the one or both subqueries that are of a type in the set of non-exist subquery types to one of: an EXISTS subquery or a NOT EXISTS subquery.

11. The method of claim 1, wherein the pair of set operation-based subqueries is a first pair of set operation-based subqueries, the contained subquery is a first contained subquery and the container subquery is a first container subquery, and the method further comprising:
determining that a second pair of set operation-based subqueries, of the plurality of subqueries, satisfies the join-and-set-operation-based containment criteria;
wherein the second pair of set operation-based subqueries comprises a second contained subquery and a second container subquery; and
wherein said transforming the query further comprises, responsive to determining that the second pair of set operation-based subqueries satisfies the join-and-set-operation-based containment criteria, performing additional subquery removal by eliminating one or more of the second pair of set operation-based subqueries.

12. The method of claim 1, wherein said transforming the query further comprises unnesting one or more subqueries of the plurality of subqueries.

13. One or more non-transitory computer-readable media storing one or more sequences of instructions that, when executed by one or more processors, cause:
a database management system transforming a query to produce a transformed query;
wherein the query includes a plurality of subqueries;
wherein said transforming the query comprises:
determining whether a pair of set operation-based subqueries, of the plurality of subqueries, satisfies join-and-set-operation-based containment criteria at least by:
identifying one or more tables that are not common among the pair of set operation-based subqueries as uncommon one or more tables;
determining the uncommon one or more tables are referenced in a particular subquery of the pair of set operation-based subqueries and are not referenced in any other subquery of the pair of set operation-based subqueries thereby determining a contained subquery and a container subquery of the pair of set operation-based subqueries; and
in response to determining that the uncommon one or more tables are referenced in the particular subquery of the pair of set operation-based subqueries and are not referenced in any other subquery of the pair of set operation-based subqueries, determining that the pair of set operation-based subqueries, satisfies the join-and-set-operation-based containment criteria;
in response to the database management system determining that the pair of set operation-based subqueries, of the plurality of subqueries, satisfies the join-and-set-operation-based containment criteria, performing subquery removal,
wherein the pair of set operation-based subqueries comprises the contained subquery and the container subquery, and
wherein said performing the subquery removal comprises eliminating one or more of the pair of set operation-based subqueries; and
executing the transformed query.

14. The one or more non-transitory computer-readable media of claim 13, wherein said performing the subquery removal further comprises not replacing the eliminated one or more of the pair of set operation-based subqueries with any other subquery.

15. The one or more non-transitory computer-readable media of claim 13, wherein:
the container subquery includes a particular set of query components that comprises at least one table and zero or more of:
a join condition for the at least one table,
a correlation condition for the at least one table, or
a filter condition for the at least one table; and
said determining that the pair of set operation-based subqueries satisfies the join-and-set-operation-based containment criteria comprises determining that the contained subquery comprises the particular set of query components and at least one additional table and zero or more of:
a join condition for the at least one additional table,
a correlation condition for the at least one additional table, or
a filter condition for the at least one additional table.

16. The one or more non-transitory computer-readable media of claim 13, wherein:
both the container subquery and the contained subquery are EXISTS subqueries;
the container subquery is conjunctive with the contained subquery; and
said eliminating comprises eliminating the container subquery.

17. The one or more non-transitory computer-readable media of claim 13, wherein:
both the container subquery and the contained subquery are EXISTS subqueries;
the container subquery is disjunctive with the contained subquery; and
said eliminating comprises eliminating the contained subquery.

18. The one or more non-transitory computer-readable media of claim 13, wherein:
both the container subquery and the contained subquery are NOT EXISTS subqueries;

the container subquery is disjunctive with the contained subquery; and said eliminating comprises eliminating the container subquery.

19. The one or more non-transitory computer-readable media of claim 13, wherein:

both the container subquery and the contained subquery are NOT EXISTS subqueries;

the container subquery is conjunctive with the contained subquery; and said eliminating comprises eliminating the contained subquery.

20. The one or more non-transitory computer-readable media of claim 13, wherein:

the container subquery is a NOT EXISTS subquery;

the contained subquery is an EXISTS subquery;

wherein the container subquery is conjunctive with the contained subquery;

said eliminating comprises eliminating, from the query, the pair of set operation-based subqueries; and said transforming the query further comprises replacing the pair of set operation-based subqueries with a FALSE predicate.

21. The one or more non-transitory computer-readable media of claim 13, wherein:

the container subquery is an EXISTS subquery;

the contained subquery is a NOT EXISTS subquery;

wherein the container subquery is disjunctive with the contained subquery; and said eliminating comprises eliminating, from the query, the pair of set operation-based subqueries.

22. The one or more non-transitory computer-readable media of claim 13, wherein:

one or both of the pair of set operation-based subqueries are one of a set of non-exist subquery types comprising: ANY, IN, ALL, or NOT IN;

the one or more sequences of instructions further comprise instructions that, when executed by one or more processors, cause, prior to said determining that the pair of set operation-based subqueries satisfies the join-and-set-operation-based containment criteria, converting each subquery of the one or both subqueries that are of a type in the set of non-exist subquery types to one of: an EXISTS subquery or a NOT EXISTS subquery.

23. The one or more non-transitory computer-readable media of claim 13, wherein the pair of set operation-based subqueries is a first pair of set operation-based subqueries, the contained subquery is a first contained subquery and the container subquery is a first container subquery, and wherein the one or more sequences of instructions further comprise instructions that, when executed by one or more processors, cause:

determining that a second pair of set operation-based subqueries, of the plurality of subqueries, satisfies the join-and-set-operation-based containment criteria;

wherein the second pair of set operation-based subqueries comprises a second contained subquery and a second container subquery; and wherein said transforming the query further comprises, responsive to determining that the second pair of set operation-based subqueries satisfies the join-and-set-operation-based containment criteria, performing subquery removal by eliminating one or more of the second pair of set operation-based subqueries.

24. The one or more non-transitory computer-readable media of claim 13, wherein said transforming the query further comprises unnesting one or more subqueries of the plurality of subqueries.

* * * * *

UNITED STATES PATENT AND TRADEMARK OFFICE
CERTIFICATE OF CORRECTION

PATENT NO. : 11,714,810 B2
APPLICATION NO. : 17/213034
DATED : August 1, 2023
INVENTOR(S) : Ahmed et al.

It is certified that error appears in the above-identified patent and that said Letters Patent is hereby corrected as shown below:

On the Title Page

Column 1, under Title, Line 2, delete "SUB QUERY" and insert -- SUBQUERY --, therefor.

In the Specification

In Column 1, Line 2, delete "SUB QUERY" and insert -- SUBQUERY --, therefor.

In Column 3, Line 46, delete "thecontained" and insert -- the contained --, therefor.

In Column 7, Line 32, before "NOT" insert -- WHERE --, therefor.

In Column 11, Line 8, delete "2.d" and insert -- T2.d --, therefor.

In Column 11, Line 33, delete "t1.d" and insert -- T1.d --, therefor.

Signed and Sealed this
Twenty-eighth Day of May, 2024

Katherine Kelly Vidal
*Director of the United States Patent and Trademark Office*